June 27, 1961  J. BOLSEY  2,989,908
AUTOMATIC DIAPHRAGM ADJUSTING ARRANGEMENT
FOR CAMERAS AND THE LIKE
Filed March 4, 1953                                                3 Sheets-Sheet 1
| DIST. | f NUMBERS | | |
|---|---|---|---|
| FEET | 96 A | 48 B | 24 C |
| 24 | 4 | 2 | 1 |
| 12 | 8 | 4 | 2 |
| 6 | 16 | 8 | 4 |
| 3 | 32 | 16 | 8 |
FIG. 1.
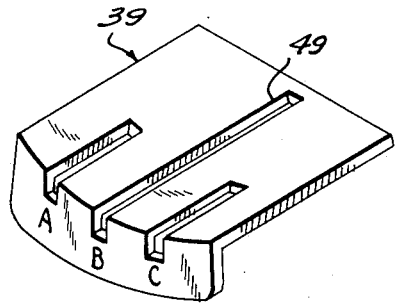
FIG. 5.
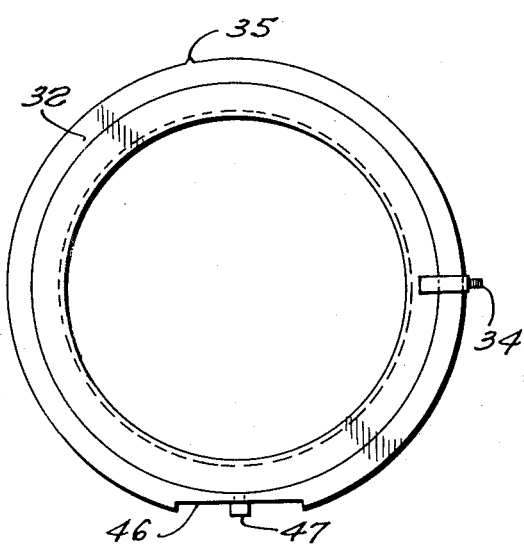
FIG. 4.
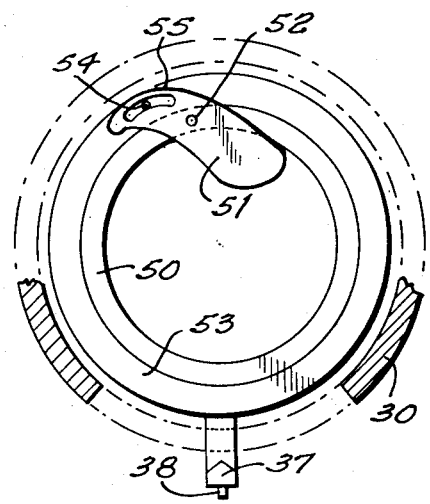
FIG. 6.
INVENTOR.
JACQUES BOLSEY
BY

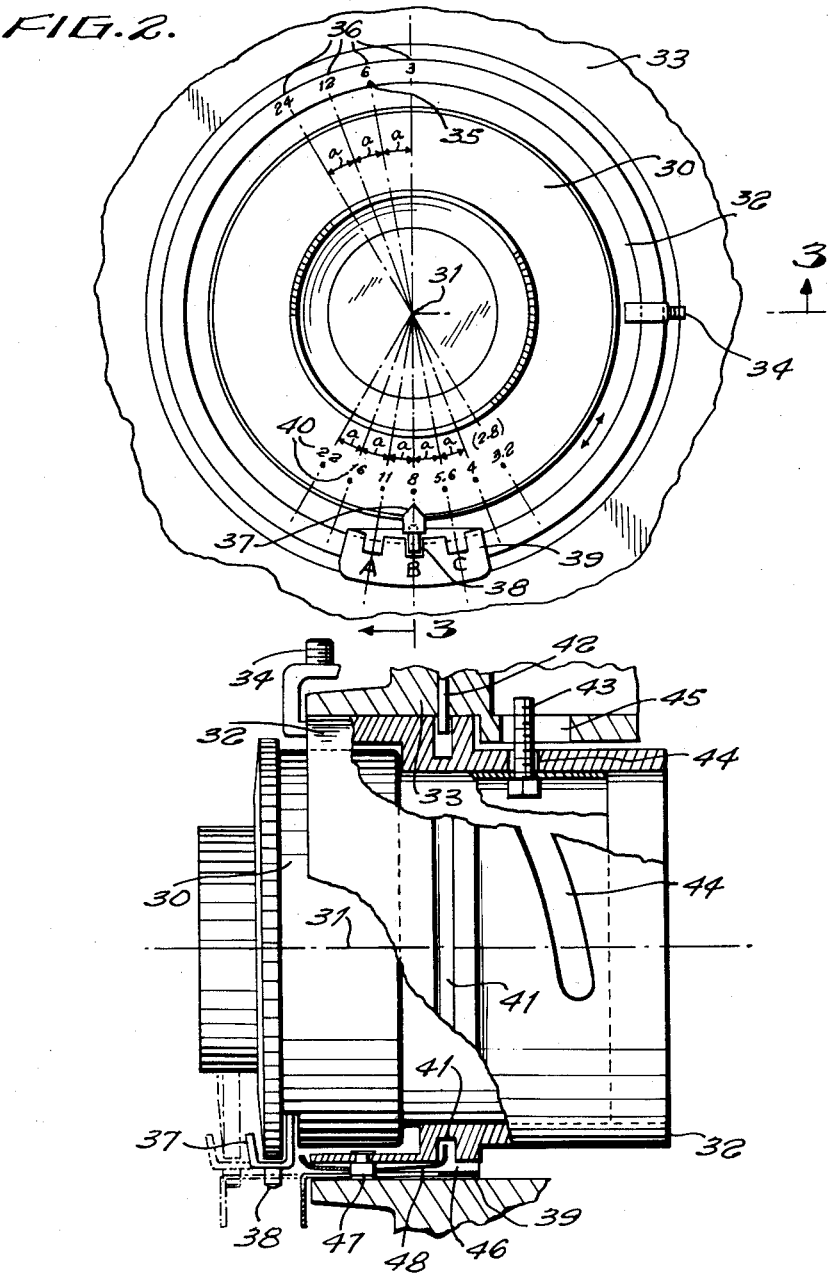

June 27, 1961

J. BOLSEY 2,989,908

AUTOMATIC DIAPHRAGM ADJUSTING ARRANGEMENT
FOR CAMERAS AND THE LIKE

Filed March 4, 1953

INVENTOR.
JACQUES BOLSEY
BY

United States Patent Office 2,989,908
Patented June 27, 1961

2,989,908
AUTOMATIC DIAPHRAGM ADJUSTING ARRANGEMENT FOR CAMERAS AND THE LIKE
Jacques Bolsey, 118 E. 25th St., New York, N.Y.
Filed Mar. 4, 1953, Ser. No. 340,264
8 Claims. (Cl. 95—64)

The present invention relates to photographic apparatus such as cameras and the like.

More particularly, the present invention relates to an apparatus for enabling the diaphragm of a camera or the like to be automatically adjusted upon focusing of the lens so as to greatly simplify camera operation, particularly for amateurs.

One of the objects of the present invention is to provide a means for interconnecting the diaphragm setting means and focus control means of a camera, or the like, for simultaneous adjustment.

Another object of the present invention is to provide a means for adjusting the relationship between the diaphragm and focus lens of a camera or the like adapted to adjust the diaphragm and focus setting simultaneously, so that the diaphragm may be suitably set for different conditions.

Yet another object of the present invention is to provide a camera or the like with a means for releasably interconnecting the lens focussing means and diaphragm setting means so that the latter may be operated separately at the option of the user in special cases where it is desired to adjust the diaphragm aperture independently of the focusing of the lens.

Still another object of the present invention is to provide an apparatus which is capable of accomplishing all of the above objects and which at the same time is of an extremely simple construction that is very reliable in operation and inexpensive to manufacture.

With the above objects in view, the present invention mainly consists of a camera or the like which includes an objective lens arranged for movement along the optical axis thereof through a set of predetermined axial positions and which includes a diaphragm movable through a set of predetermined aperture positions. The objective lens is focused by a lens focusing member which is turnable about the optical axis of the lens, and this lens focusing member is interconnected with the objective lens by a first motion-transmitting means which moves the objective lens through the above mentioned predetermined axial positions thereof upon movement of the lens focusing member through a first set of equal angular distances. The camera also includes a diaphragm adjusting member also movable about the optical axis and being interconnected with the diaphragm by a second motion-transmitting means which moves the diaphragm through the above mentioned set of pre-determined aperture positions upon movement of the diaphragm adjusting member through a second set of equal angular distances which are equal to the angular distances of the above-mentioned first set of angular distances through which the lens focusing member turns. An adjustable connecting means interconnects the lens focusing and diaphragm adjusting members for simultaneous movement with each other so that the diaphragm aperture will be automatically adjusted upon focusing of the lens, the adjustability of this connecting means enabling the relationship between the diaphragm and lens to be preset for different conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a table illustrating principle on which the present invention is based;

FIG. 2 is a fragmentary front view of a camera illustrating the relationship between the lens and diaphragm operating members;

FIG. 3 is a fragmentary sectional view taken along line 3—3 of FIG. 2 in the direction of the arrows;

FIG. 4 is a front view of the lens focusing member of the present invention;

FIG. 5 is a perspective view of a connecting member for interconnecting the lens focusing and diaphragm adjusting member;

FIG. 6 is a view of a part of the diaphragm structure of the present invention;

Figure 7:
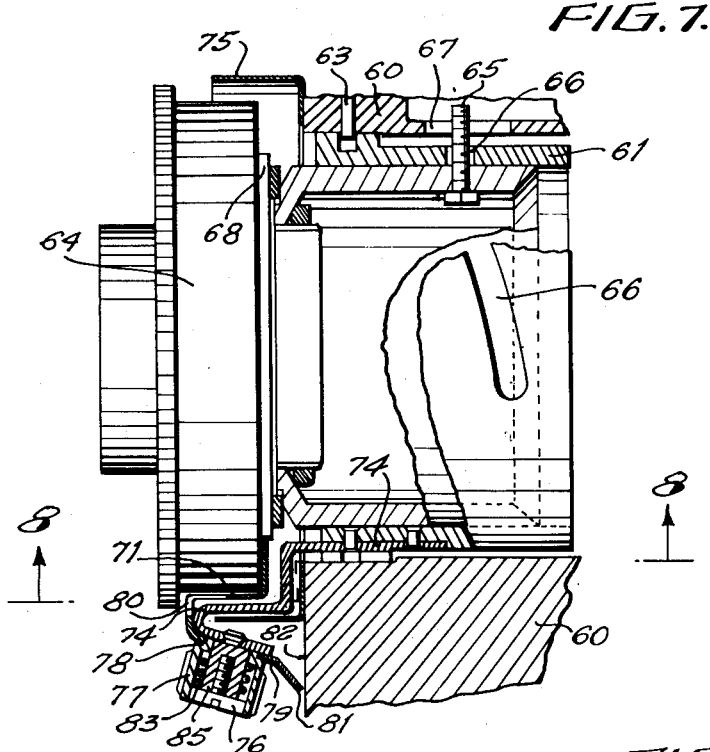
FIG. 7 is a side, sectional view of a different embodiment of the invention.

Referring now to the drawings, the principle of the present invention may be best understood with reference to FIG. 1 of the drawings. Most amateurs use only a small number of different types of film and flash bulbs, and for the majority of cases a shutter speed of $\frac{1}{50}$ of a second is sufficient. Therefore, assuming the shutter speed to be set at $\frac{1}{50}$ of a second for all cases, the proper setting of the disphragm aperture will in general depend upon the distance of the subject being photographed from the camera, the type of film used, and the type of flash bulb used. At a given shutter speed and for a given combination of film and bulb used, the $f$ stop is a function of the distance between the camera and subject. It has been found that with the distances from the subject to the camera appearing in the first column of FIG. 1, one combination of flash bulb and film require the $f$ numbers appearing in the column A, while a second combination of frequently used types of flash bulb and film require the $f$ numbers of column B at the corresponding distances shown in the first column, and a third commonly used combination of bulb and film require the $f$ numbers shown in column C for the corresponding distances appearing in the first column of FIG. 1.

The present invention takes advantage of the fact that the $f$ numbers for the various combinations of film and flash bulbs have a definite relationship to each other. Thus, it will be seen that combination A requires the same $f$ number at a distance of 24 feet that the combination B requires at 12 feet. Also, the combination A at 24 feet, B at 12 feet, and C at 6 feet all require the same $f$ number, and the same thing applies to the combination A at 12 feet, B at 6 feet, and C at 3 feet. The present invention correlates the diaphragm adjustment with the focusing so as to automatically adjust the diaphragm to the $f$ numbers of column A, for example, for the distances of the subject from the camera corresponding to the first column of FIG. 1. Moreover, the present invention makes the angular distances through which the lens focusing member moves for the settings of the first column of FIG. 1 equal to each other, and the angular distances through which the diaphragm adjusting member moves for the corresponding $f$ numbers equal to each other and to the angular distances through which the lens focusing member turns. In this way, if the lens focusing and diaphragm adjusting members are releasably interconnected to automatically adjust the diaphragm to the $f$ numbers of column B, for example, for the corresponding distances of the first column of FIG. 1, then in order to adapt the apparatus for automatic diaphragm adjustment with combination A or combination C, it is only necessary to disconnect the the lens focusing and diaphragm operating members and turn the same with respect to each other in one or the other angular direction, depending on whether the camera is being set for combination A or combination C, and through a distance equal to one of the above-mentioned equal angular distances between the f numbers or distance settings, and then to again connect the diaphragm adjusting and lens focusing members to each other for simultaneous operation.

FIGS. 2-6 illustrate a particular example of the present invention as applied to a camera having an automatic range finder, for example of the type disclosed in the copending U.S. application Serial Number 52,930, filed October 5, 1948, now Patent Number 2,689,509, issued September 21, 1954, but it is to be understood that the principle of the present invention is applicable to all types of photographic equipment and to all conditions of photography, such as daylight, night, black and white, or color photography.

Referring to FIG. 2 of the drawings, there is shown therein a camera constructed in accordance with the present invention, as viewed from the front. The lens barrel 30 is adapted to move back and forth along the optical axis 31 during focusing. A sleeve 32 surrounds the lens barrel and is turnably mounted in a substantially cylindrical opening in the camera body 33 for turning movement about the optical axis 31 and is connected to the lens to focus the same. A handle 34 is connected to the sleeve 32 for turning the same, and a pointer 35 is also fixed to the sleeve 32 to cooperate with the indicia 36 indicating the distance of the subject from the camera and corresponding to the distances appearing in the first column of FIG. 1. It will be seen that the indicia 36 are spaced from each other by equal angular distances $a$.

The lens barrel carries a diaphragm which is adjusted by the diaphragm adjusting member 37 which is turnable about the optical axis 31 and which has fixed thereto a pin member 38, which may be integral with the diaphragm adjusting member 37, if desired. This pin 38 may be threadedly connected to member 37 or may be welded thereto. A connecting member 39 is joined to the sleeve 32 for turning movement therewith and has a plurality of engaging positions A, B, C adapted to be selectively engaged with the pin 38 and being located apart from each other by the angular distances $a$. It will be seen that the diaphragm adjusting member 37 cooperates with indicia 40, on the front of the lens barrel, which corresponds to the f numbers of FIG. 1 and which are located apart from each other by the same angular distances $a$.

In the particular position illustrated, the apparatus is set for the B combination of flash bulb and film so that, in accordance with the table of FIG. 1, the distance of 6 feet corresponds to the f number 8. If the apparatus had been set for combination C, the f number for the distance of 6 feet would have been 5.6, and if it had been set for the combination A the f number would have been 11. Also, it is seen that with the position of the parts shown in FIG. 2, a distance of 12 feet will give the f number 5.6, while the distance of 3 feet, for example, would give the f number 11 and a distance of 24 feet would automatically produce a diaphragm setting corresponding to the f number 4.

As is shown in FIG. 3, the sleeve 32 is formed with an annular groove 41 in which a member 42, fixed to the camera body 33, slidably projects so as to limit the sleeve 32 to turning movement and prevent axial movement thereof. The lens barrel 30 has fixedly connected thereto a pin 43 which extends through a specially designed, curved slot 44 formed in the sleeve 32 and into a slot 45, of the camera body 33, which is straight and parallel to the optical axis 31 so that the lens barrel 30 can only move forwardly and rearwardly along the optical axis 31 in accordance with the curvature of slot 44. As was mentioned above, this slot 44 is specially designed, and it is curved in such a way that it will move the lens barrel 30 axially through the positions corresponding to focusing distances of 24, 12, 6, and 3 feet, for example, upon turning of the sleeve 32 through the successive equal angular distances $a$ shown in FIG. 2. The pin 43 extends upwardly through the slot 45 to cooperate with an automatic range finder mechanism (not shown) which may be of the type which is fully illustrated and described in the copending application Serial Number 52,930, filed October 5, 1948, now Patent Number 2,689,509, issued September 21, 1954, so that the operator need only turn the sleeve 32 by means of handle 34 to automatically focus the lens.

The sleeve 32 is shown from the front in FIG. 4, and as may be clearly seen from FIG. 4, the sleeve 32 is formed with an elongated cutout 46 and has fixedly connected thereto a pin 47 extending into this cutout. As is apparent from FIG. 3, a leaf spring 48 is located in the cutout 46 and has opposite bent ends one of which extends into the annular slot 41 of sleeve 32 and the other of which is located opposite the front end of sleeve 32 just above the cutout 46, this spring 48 being provided with a suitable opening through which the pin 47 extends. The connecting member 39 is shown in FIG. 5 where it may be seen that it is curved transversely thereof in accordance with the curvature of sleeve 32 and is provided with an elongated central slot 49 forming an extension of the notch corresponding to the engaging position B, and is formed with two additional notches corresponding to the engaging positions A and C, respectively, these notches being located apart from each other by the equal angular distances $a$, as was described above.

As may be seen from FIG. 3, the member 39 is located in the cutout 46 for movement toward and away from the diaphragm adjusting member 37 in a direction parallel to the optical axis 31. The pin 47 extends into the slot 49, and the spring 48 frictionally bears against the member 39 so that the latter is in frictional engagement with the camera body 33 and will be maintained either in the solid line position shown in FIG. 3, where the diaphragm adjusting member 37 is not connected to the sleeve 32 and may therefore be independently operated, or in the dotted line position shown in FIG. 3, where the diaphragm adjusting member 37 is connected, through member 39, to the sleeve 32 for turning movement therewith about the optical axis 31. The notches of member 39 are made long enough to enable the front end of member 39 to be located a substantial distance forwardly of the pin 38, as is shown for example by the dotted line position of member 39 and the solid line pin 38 of FIG. 3. Therefore, as the barrel 30 moves along the optical axis 31, there is no danger that the pin 38 will move out of any one of the notches of member 39.

As is shown in FIG. 6, where only one of the diaphragm blades is shown for the sake of clarity, the diaphragm includes an inner stationary ring 50 to which the diaphragm blades 51 are pivotally connected at a plurality of points 52 distributed about the ring 50, and the diaphragm includes an outer movable ring 53 to which the adjusting member 37 is fixedly connected, this member 37 extending through the lens barrel 30 so as to be accessible to the operator. The turnable ring 53 has fixedly mounted thereon a plurality of pins 54 respectively extending through slots 55 formed in end portions of the diaphragm blades 51. The curvature of these slots is specially designed so that when the adjusting member 37 and ring 53 therewith are turned through the equal angular distances $a$, the diaphragm blades 51 will be positioned at the proper aperture positions coresponding to the f numbers shown in FIG. 2.

It is believed to be apparent from the above description that the connecting member 39 may be moved back and forth to selectively connect the sleeve 32 and diaphragm adjusting member 37 to each other at any one of the predetermined angular positions corresponding to the film and bulb combinations A, B, and C, and that the member 39 may at any time be moved to the solid line position shown in FIG. 3 to permit the diaphragm to be adjusted independently of the focusing apparatus. Although only three selective positions A, B and C of the diaphragm operating member 37 with respect to the sleeve 32 have been described above, the invention obviously is not limited to any particular number of selective positions.

Figure 8:
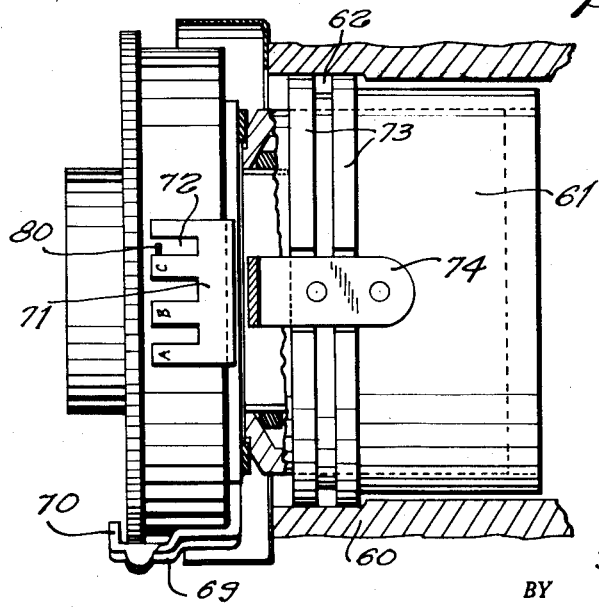
FIG. 8 is a sectional view taken along line 8—8 of FIG. 7 in the direction of the arrows.

FIGS. 7 and 8 illustrate another embodiment of the invention which operates on exactly the same principle as the above described structure. In the camera body 60 there is turnably mounted a sleeve 61 formed with an annular groove 62 into which a pin 63, fixed to the body 60, extends to permit the sleeve 61 to rotate about the optical axis of the lens barrel 64 while being constrained against axial movement. The lens barrel 64, in the same way as was described above, has a pin 65 fixed thereto and extending through a specially curved slot 66 of sleeve 61 and through an elongated slot 67 in the body 60, this slot 67 being parallel to the optical axis, so that the lens barrel is held against rotation while being free for axial movement along its optical axis, the pin 65 being associated with an automatic range finder as was discussed above.

The lens barrel 64 is provided with a diaphragm operable by a turnably mounted ring 68 which has an operating handle 69 (FIG. 8) extending therefrom and having a pointer 70 at its extremity adapted to cooperate with f numbers identical with indicia 40 and located on the front face of barrel 64. Integral with the diaphragm operating member 68 is an extension 71 extending about a part of the lens barrel 64 and having three elongated notches 72 formed therein (FIG. 8) to provide the fingers carrying the indicia A, B, C which have the same significance as the indicia on member 39 shown in FIG. 5. Thus, upon turning of the handle 69, the diaphragm will be adjusted and the extension 71 will turn with the diaphragm adjusting member 68.

The sleeve 61 is provided with a pair of annular projections 73 which form the groove into which the pin 63 extends. These annular projections 73 are interrupted, as is clearly shown in FIG. 8, the accommodate a focusing lever 74 which is riveted to the sleeve 61 and located between the ends of the annular projections 73. This focusing lever 74 extends freely about the tube 75 fixed to the camera body 60, as is clearly shown in the lower part of FIG. 7. At its outer rearwardly extending free end portion, the focusing lever 74 has a pin 85 riveted thereto, and this pin 85 is formed with a threaded bore in which a screw member 76 is located, the head of the screw member 76 being of a larger diameter than the pin 85. A tubular member 77 is located about the pin 85 and slidably engages the outer periphery of the head of the screw member 76, this tubular member 77 having an inwardly extending annular flange 78 at its end distant from the head of screw member 76 and this annular flange of tubular member 77 slidably engaging the pin 85. At the outer face of the annular flange 78, the tubular member 77 is fixedly riveted to an elongated member 79 which at one end carries a projection 80 adapted to be located in one of the notches 72. At its opposite end the member 79 is provided with a pointer 81 adapted to cooperate with indicia on the front face portion 82 of the camera body 60, this indicia being identical with the indicia 36 of FIG. 2. Between the annular flange 78 and the head of screw member 76 there is located a spring 83 which urges the sleeve 77, and the member 79 therewith, toward the focusing lever 74.

The above described apparatus operates as follows:

In order to connect the focusing lever 74 at one of the three predetermined positions corresponding to the indicia A, B, C shown in FIG. 8, it is only necessary to move the tubular member 77 against the action of spring 83 away from the lever 74 so as to move the member 79 away from the extension 71 of the diaphragm operating member 68, and in this way the projection 80 of member 79 may be moved out of one of the notches 72 and the sleeve 61 may be turned by turning the lever 74 to locate the projection 80 over any desired notch 72. Then the tubular member 77 is released to the action of spring 83 and the diaphragm operating member 68 is interconnected with the focusing lever 74 for simultaneous turning movement therewith to produce results identical with those described above in connection with the structure illustrated in FIGS. 2–6. If it is desired to operate the diaphragm independently of the focusing, it is only necessary to locate the projection 80 of member 79 to one side of the extension 71, by moving it out of one of the notches 72 and turning the focusing lever 74 in the same way as was described above. Thus, the embodiment of FIGS. 7 and 8 is capable of accomplishing the same results as the embodiment of FIGS. 2–6.

It will be understood that each of the elements described above, or two or more together, may also find a useful application in other types of automatic diaphragm adjusting mechanism for cameras and the like differing from the types described above.

While the invention has been illustrated and described as embodied in a releasable and adjustable automatic diaphragm adjusting mechanism for cameras and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a lens barrel mounted in the camera for movement along the optical axis thereof; a sleeve mounted in the camera for turnable movement about said optical axis and being connected to said lens barrel for moving the same axially along said optical axis thereof upon turning of said sleeve about said optical axis; a diaphragm in said lens barrel; a diaphragm adjusting member extending from said lens barrel, being turnable about said optical axis, and being located adjacent said sleeve; and a releasable connecting member mounted in said sleeve for movement toward and away from said diaphragm adjusting member for releasably connecting the latter to said sleeve for turning movement therewith so that said diaphragm may be adjusted simultaneously or separately from said lens barrel, said connecting member being formed with a plurality of angularly spaced notches adapted to selectively engage said diaphragm adjusting member for maintaining the latter at an adjusted angular position with respect to said sleeve.

2. A camera comprising, in combination, a camera body having a substantially cylindrical opening extending into the same from the front thereof; a lens barrel located in said opening; a sleeve located about said lens barrel and being located within said opening for turning movement about the optical axis of said lens barrel, said sleeve being operatively connected to said lens barrel for moving the same axially along said optical axis thereof upon rotation of said sleeve about said optical axis, said sleeve being formed with an elongated cutout extending parallel to said optical axis; a diaphragm mounted in said lens barrel; a diaphragm adjusting member extending from said lens barrel, being located adjacent said sleeve, and being turnable about said optical axis; a connecting member extending from said sleeve toward said diaphragm adjusting member and being located in said cutout for movement between an operative position, where said connecting member engages said diaphragm adjusting member for turning the latter together with said sleeve, and an inoperative position, where said connecting member is spaced from said diaphragm adjusting member so that the latter may be turned independently of said sleeve; and a leaf spring located in said cutout and frictionally engaging said connecting member to maintain the same in one of said positions thereof.

3. A camera comprising, in combination, a camera body having a substantially cylindrical opening extending into the same from the front thereof; a lens barrel located in said opening; a sleeve located about said lens barrel and being located within said opening for turning movement about the optical axis of said lens barrel, said sleeve being operatively connected to said lens barrel for moving the same axially along said optical axis thereof upon rotation of said sleeve about said optical axis, said sleeve being formed with an elongated cutout extending parallel to said optical axis; a diaphragm mounted in said lens barrel; a diaphragm adjusting member extending from said lens barrel, being located adjacent said sleeve, and being turnable about said optical axis; and a connecting member extending from said sleeve toward said diaphragm adjusting member and being located in said cutout for movement in a direction parallel to said optical axis between an operative position, where said connecting member engages said diaphragm adjusting member for turning the latter together with said sleeve, and an inoperative position, where said connecting member is spaced from said diaphragm adjusting member so that the latter may be turned independently of said sleeve.

4. A camera comprising, in combination, a camera body having a substantially cylindrical opening extending into the same from the front thereof; a lens barrel located in said opening; a sleeve located about said lens barrel and being located within said opening for turning movement about the optical axis of said lens barrel, said sleeve being operatively connected to said lens barrel for moving the same axially along said optical axis thereof through a set of predetermined axial positions upon rotation of said sleeve about said optical axis through a first set of successive equal angular distances, respectively, said sleeve being formed with an elongated cutout extending parallel to said optical axis; a diaphragm mounted in said lens barrel; a diaphragm adjusting member extending from said lens barrel, being located adjacent said sleeve, and being turnable about said optical axis, said diaphragm adjusting member being connected to said diaphragm to move the same through a set of predetermined aperture positions upon turning of said diaphragm operating member respectively through a second set of equal angular distances which are equal to the angular distances of said first set; and a connecting member extending from said sleeve toward said diaphragm adjusting member and being located in said cutout for movement between an operative position, where said connecting member engages said diaphragm adjusting member for turning the latter together with said sleeve, and an inoperative position, where said connecting member is spaced from said diaphragm adjusting member so that the latter may be turned independently of said sleeve, said connecting member being formed with a plurality of angularly spaced engaging positions for selectively engaging said diaphragm adjusting member at a predetermined angular position with respect to said sleeve, said engaging positions of said connecting member being located apart from each other by a third set of equal angular distances equal to the angular distances of said first and second sets.

5. In a camera, in combination, a lens barrel mounted in the camera for movement along the optical axis thereof; a sleeve mounted in the camera for turnable movement about said optical axis and being connected to said lens barrel for moving the same axially along said optical axis thereof upon turning of said sleeve about said optical axis; a diaphragm in said lens barrel; a diaphragm adjusting member extending from said lens barrel, being turnable about said optical axis, and having an extension formed with a plurality of cutouts; a releasable connecting member mounted on said sleeve for movement toward and away from said extension of said diaphragm adjusting member to be selectively located in one of said cutouts thereof; and spring means operatively connected to said connecting member for urging the same toward said extension of said diaphragm adjusting member.

6. In a camera, in combination, a lens barrel mounted in the camera for movement along the optical axis thereof; a sleeve mounted in the camera for turnable movement about said optical axis and being connected to said lens barrel for moving the same axially along said optical axis thereof upon turning of said sleeve about said optical axis; a diaphragm in said lens barrel; a diaphragm adjusting member extending from said lens barrel, being turnable about said optical axis, and having an arcuate extension located along a curve having its center in said optical axis and being formed with a plurality of cutouts angularly spaced from each other about said optical axis; a releasable connecting member mounted on said sleeve for movement toward and way from said extension of said diaphragm adjusting member to be selectively located in one of said cutouts thereof; and spring means operatively connected to said connecting member for urging the same toward said extension of said diaphragm adjusting member.

7. In a camera, in combination, a lens barrel mounted in the camera for movement along the optical axis thereof; a sleeve mounted in the camera for turnable movement about said optical axis and being connected to said lens barrel for moving the same axially along said optical axis thereof upon turning of said sleeve about said optical axis; a diaphragm in said lens barrel; a diaphragm adjusting member extending from said lens barrel, being turnable about said optical axis, and having an arcuate extension located along a curve having its center in said optical axis and being formed with a plurality of cutouts angularly spaced from each other about said optical axis; a focusing lever fixed to and extending from said sleeve for turning the same and having a portion located opposite said extension of said diaphragm operating member; a releasable connecting member mounted on said portion of said focusing lever for movement toward and away from said extension of said diaphragm operating member and having a free end portion adapted to be selectively located in one of said cutouts of said extension; and spring means operatively connected to said connecting member to urge the same toward said extension of said diaphragm operating member so as to releasably hold said free end portion of said connecting member in one of said cutouts to connect said diaphragm operaing member and sleeve to each other in a predetermined angular relationship for turning movement together.

8. In a camera, in combination, an annular focusing member; means supporting said focusing member for turning movement about the optical axis and moving the same along the optical axis simultaneously with said turning movement; a diaphragm adjusting member carried by the camera for turning movement about the optical axis; and a pair of connectors respectively carried by said members for movement therewith about the optical axis and for movement to and from an operative position where said connectors interconnect said focusing member and diaphragm adjusting member for movement together about the optical axis, one of said connectors being formed with a plurality of notches equidistantly spaced about the optical axis and the other of the connectors having a portion small enough to be selectively located in one of said notches, whereby said focusing member and diaphragm adjusting member may be interconnected and maintained at a predetermined angular relationship during simultaneously turning about the optical axis.

References Cited in the file of this patent

UNITED STATES PATENTS

| | | |
|---|---|---|
| 2,213,749 | Strauss | Sept. 3, 1940 |
| 2,334,075 | Davenport | Nov. 9, 1943 |
| 2,464,559 | Davenport et al. | Mar. 15, 1949 |
| 2,549,230 | Parody | Apr. 17, 1951 |
| 2,596,328 | Dorsey | May 13, 1952 |

FOREIGN PATENTS

| | | |
|---|---|---|
| 440,299 | France | May 1, 1912 |